ELECTRICAL INFORMATION STORAGE APPARATUS

Filed Oct. 28, 1949 6 Sheets-Sheet 1

Frederic Calland Williams and Tom Kilburn
Inventors
By Morrison & Hall
Attorneys March 15, 1960 F. C. WILLIAMS ET AL 2,928,983

ELECTRICAL INFORMATION STORAGE APPARATUS

Filed Oct. 28, 1949 6 Sheets-Sheet 2

Frederic Calland Williams
Tom Kilburn
Inventors
By Moore & Hall
Attorneys

Frederic Calland Williams
Tom Kilburn
Inventors
By Morse & Hall,
Attorneys.

March 15, 1960 F. C. WILLIAMS ET AL 2,928,983

ELECTRICAL INFORMATION STORAGE APPARATUS

Filed Oct. 28, 1949 6 Sheets-Sheet 4

Frederic Calland Williams
Tom Kilburn
Inventors
By Moore & Hall
Attorneys.

Frederic Calland Williams
Tom Kilburn
Inventors
By Moore & Hall,
Attorneys.

March 15, 1960 F. C. WILLIAMS ET AL 2,928,983
ELECTRICAL INFORMATION STORAGE APPARATUS
Filed Oct. 28, 1949 6 Sheets-Sheet 6

INVENTORS
FREDERIC C. WILLIAMS and
TOM KILBURN
BY Stevens, Davis, Miller & Mosher
ATTORNEYS 2,928,983

ELECTRICAL INFORMATION STORAGE APPARATUS

Frederic C. Williams, Timperley, and Tom Kilburn, Davyhulme, Manchester, England, assignors, by mesne assignments, to International Business Machines Corporation, New York, N.Y., a corporation of New York Application October 28, 1949, Serial No. 124,192

Claims priority, application Great Britain November 1, 1948

33 Claims. (Cl. 315—20)

The present invention relates to improvements in or modifications of the electrical information storage means described in the specification of co-pending United States application Serial No. 50,136, filed September 20, 1948 for Electrical Storage Apparatus.

The said specification describes a storage system in which elements of information, each of which may have one of two significances, are stored as one of two conditions of charge distribution associated with discrete areas of the insulating screen or storage surface of a cathode ray tube. The information is inserted on the screen by scanning the screen with the cathode ray beam which is modulated in accordance with the information to be stored; this process of inserting information on the screen being known as "writing." The information may be extracted from the store by scanning the charge distribution set up on the screen by the modulated electron beam with the cathode ray beam, this process of extracting information from the store beam being known as "reading." The information may conveniently comprise the digits "0" and "1" in the binary system of notation and the storage system provided by the present invention has particular application in binary-digital computing machines. The said specification also described how the stored information may be periodically regenerated to avoid the limitation which would otherwise be imposed on the system by the leakage of charges over the storage surface.

The basic principle upon which the storage property of the present invention and of the invention of the said specification depends, is the difference in nature of the charge residing at a discrete area of the insulating screen of a cathode ray tube when: (i) the discrete area alone is irradiated with electrons and (ii) when an adjacent area, not spaced from the discrete area by more than a critical distance, is irradiated after the irradiation of the discrete area.

In the particular arrangement of the said patent application the beam is caused to sweep out a line on the cathode ray tube screen and the beam is normally switched on as it reaches a discrete area by applying a short duration positive pulse (a dot pulse) to the cathode ray tube control grid. Thus a spot is set up on the cathode ray tube screen at the discrete area, giving a charge distribution of a first kind, which may serve to represent the binary digit "0." The charge distribution of a second kind is set up by extending the duration of the dot pulse, thus setting up a dash on the cathode ray tube screen and giving a charge distribution of a second kind which may serve to represent the binary digit "1."

In operating the present invention two states of charge distribution at a discrete area on the insulating or storage screen are obtained by two differing sequences of bombardment of the area by the cathode ray tube electron beam, namely: (i) bombardment of the said discrete area and (ii) bombardment of the said discrete area followed by bombardment of an inner area lying within the outer boundaries of the said discrete area.

Conveniently the first sequence of bombardment is effected by a defocussed beam giving a spot covering the said discrete area whilst the second sequence of bombardment is effected by the defocussed beam followed by a focussed beam while the beam scanning motion is stopped giving a smaller spot lying within the defocussed spot. The charge distributions on the storage screen surface of the cathode ray tube resulting from this defocus-focus mode of operation will be briefly described with reference to Fig. 1 of the accompanying drawings. When a discrete area on the screen surface of a cathode ray tube is bombarded with electrons having a velocity within a certain range, the number of secondary electrons emitted from the area is greater than the number of primary electrons arriving. Thus when a beam of electrons having a velocity within this range falls steadily on a single area of the screen, the area moves positive until it reaches a steady value a few volts positive with respect to the most positive electrode in the tube (usually the third anode). Parts of the screen adjacent to the bombarded area becomes slightly negative with respect to the third anode because of the rain of secondary electrons to which they are subjected.

When a defocussed beam of electrons, represented in Fig. 1 by the circle (*a*), having a velocity within this range falls on a discrete area of the screen a well of positive charge, shown at 1 in Fig. 1 will be excavated in the charge distribution on the screen. If a metallic signal pick-up electrode is attached to the outside wall of the tube, adjacent to the screen, a positive pulse will be induced in the pick-up electrode when the area is bombarded. If the beam is not focussed before it is extinguished then at a subsequent turn-on of a defocussed beam on the area, made before the charge distribution represented by the well 1 has had time to leak away, a negative pulse will be induced in the signal pick-up electrode. This is because the switching on of the beam causes a cloud of electrons in the secondary current and in the beam itself to be suddenly introduced in the vicinity of the pick-up electrode while the charge distribution represented by the well 1 is unaltered. If however, before extinction of the electron beam, the beam falling on the area is caused to become focussed as at (*b*) in Fig. 1, then some of the secondary electrons emitted at this time will partially fill up the sides of the positive charge well 1 to produce the charge distribution shown at well 2 in Fig. 1. At a subsequent turn on of a defocussed beam on the area, made before the charge distribution represented by the well 2 has had time to leak away, the charge distribution of well 2 will have to be converted to that of well 1 and a positive pulse will be induced in the signal pick-up electrode. Of course, in this case also, a negative pulse will tend to be set up by the electron cloud effect but it will be effectively cancelled by the positive pulse. The initial positive or negative pulse, at the time the beam is turned on, may be employed to control circuits associated with the cathode ray tube in such a fashion that a pattern of charge distribution once laid down may be cyclically regenerated. In employing the cathode ray tube to store binary digital information the two states of charge distribution on an area given by the two types of bombardment may be employed to represent respectively the binary digits "0" and "1." It is important to note that the order of bombardment with defocussed and focussed beams cannot be reversed. The beam at the instant of turn on must be defocussed.

According to the present invention there is provided a method of storing information in a cathode ray tube storing device which comprises setting up one or the other of two different states of charge distribution at a discrete area on a storage surface by one or the other of two different sequences of bombardment of the said surface by the cathode ray tube electron beam, namely: (i) bombardment of the said discrete area and (ii) bombardment of the said discrete area followed by bombardment of an inner area lying within the outer boundaries of the said discrete area.

In one embodiment of the invention there is provided means for changing the degree of focus of the electron beam so that in an unfocussed state it bombards the said discrete area and in a focussed state it bombards the said inner area.

In an alternative embodiment there is provided means for rapidly moving the electron beam over the said discrete area or holding the said beam stationary within the said discrete area so as to bombard said inner area.

In order that the invention may be more clearly understood and readily carried into effect reference will now be made to the accompanying drawings in which.

Figure 2:
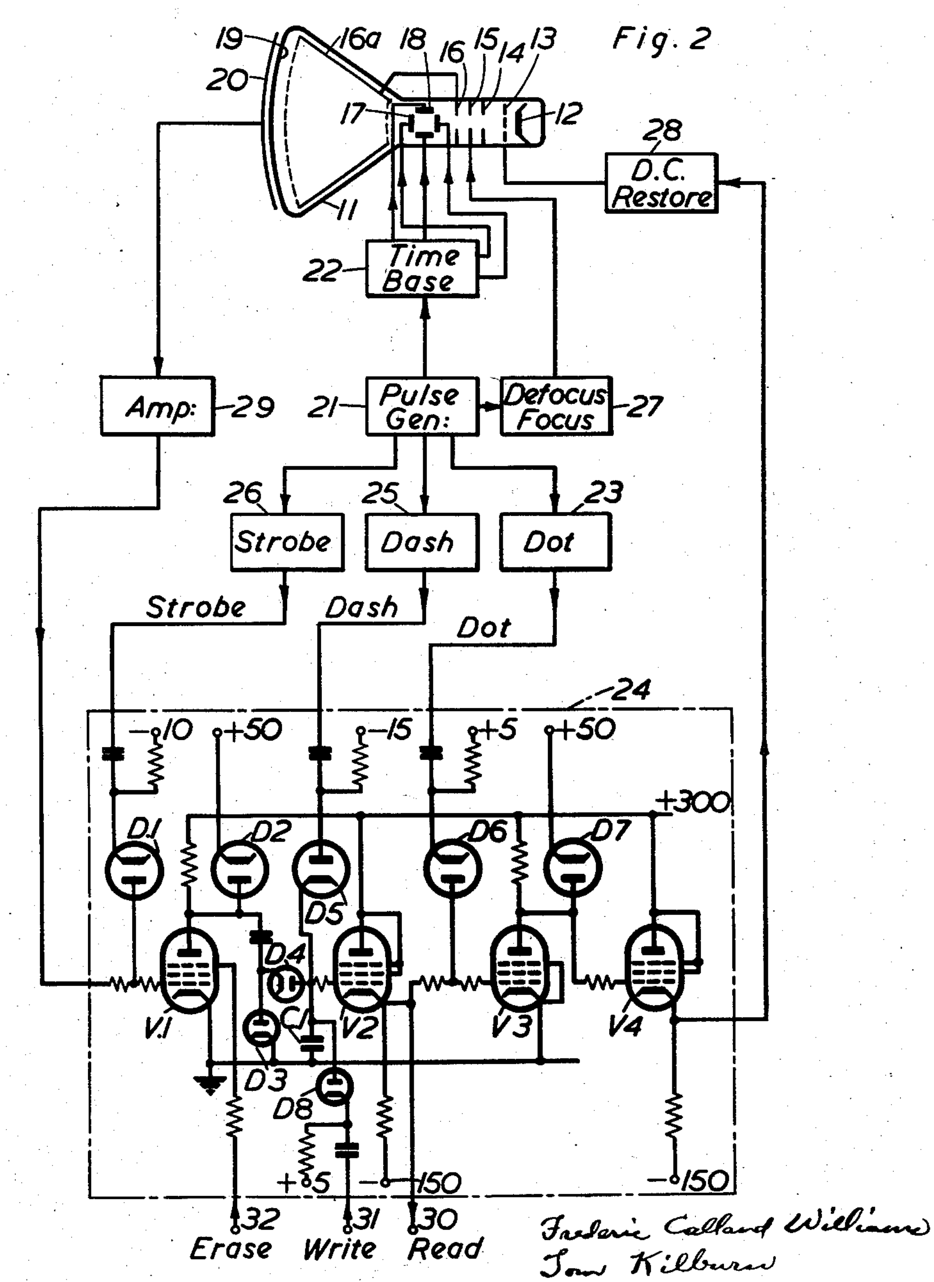
Figure 2 shows storage apparatus according to this invention in which the digit "0" is stored as a defocussed spot and the digit "1" as a defocussed-focussed spot.

In Figure 2 there is shown a normal type cathode ray tube 11 having an electron gun including a cathode 12, a control grid 13, a first anode 14, a second anode 15, a third anode 16 connected to a conducting coating 16a on the inside wall of the tube, X and Y deflecting plates 17 and 18 respectively and an insulating or storage screen 19. The electrodes of the tube have suitable voltages applies to them to cause the tube to operate with an electron beam velocity such that when a spot on the screen is bombarded with electrons from the cathode the number of secondary electrons emitted from the spot exceeds the number of primary electrons which arrive. A metallic signal pick-up electrode or signal plate 20 is held securely on the outside wall of the tube adjacent to the screen 19.

Figure 3:
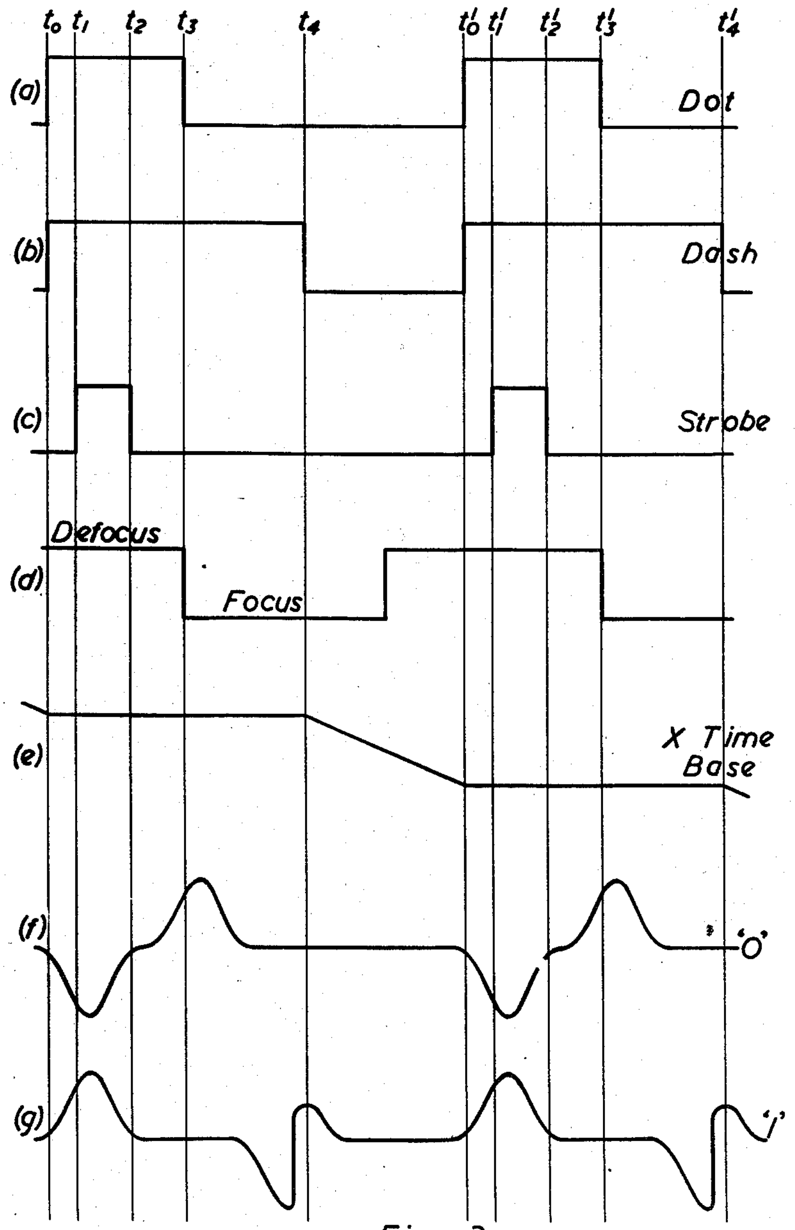
Figure 3 shows waveforms illustrating the operation of the apparatus shown in Figure 2.

A pulse generator 21 produces regularly recurring pulses which are used to synchronise all the correlated parts of the equipment. Pulses from the pulse generator 21 are used to synchronise the time-base circuits 22 the output voltages from which are applied to the X and Y plates 17 and 18 of the cathode ray tube to cause the cathode ray tube beam to scan repetitively a television type raster of 32 parallel lines. The waveform of the time-base voltage applied to the Y plates 18 is fully described in copending United States application Ser. No. 93,612, filed May 16, 1949 for Information Storage Means, now Patent No. 2,777,971, issued January 15, 1957; briefly it causes the 32 lines to be explored sequentially but alternately with a selected line. The waveform of the time-base voltage applied to the X plates is described hereinafter. Each line is divided into 32 discrete areas and during the scan of a line each discrete area is normally irradiated with electrons by applying a positive-going dot pulse to the cathode ray tube control grid 13 to switch on the electron beam. These dot pulses are obtained from a dot pulse generator 23 synchronised by the pulse generator 21 and thereby locked to the time base waveform, and are fed to the cathode ray tube control grid via a gate circuit 24. These dot pulses have the same recurrence frequency as the pulses from the pulse generator 21 and two of them are shown in Fig. 3(*a*) existing respectively from times $t_0$–$t_3$ and $t_0^1$–$t_3^1$. However a discrete area can also be irradiated by electrons by applying a positive-going dash pulse to the cathode ray tube control grid 13 to switch on the electron beam. The dash pulses are obtained from a dash pulse generator 25 synchronised by the pulse generator 21 and are also fed to the cathode ray tube control grid via the gate circuit 24. These dash pulses have the same recurrence frequency as the dot pulses and two of them are shown in Figure 3(*b*) existing respectively from times $t_0$–$t_4$ and $t_0^1$–$t_4^1$. The pulse generator 21 also synchronises a strobe pulse generator 26 which produces strobe pulses, two of which are shown in Figure 3(*c*) existing respectively from time $t_1$–$t_2$ and $t_1^1$–$t_2^1$, of the same recurrence frequency as the dot pulses. A defocus-focus voltage generator 27 synchronised by the pulse generator 21, produces a voltage having a waveform shown in Figure 3(*d*). This voltage is applied to the second anode 15 of the cathode ray tube and when it is at its high level as for example from times $t_0$–$t_3$, $t_0^1$–$t_3^1$ causes the electron beam of the cathode ray tube to become defocussed. When it is at its lower voltage level it causes the electron beam of the cathode ray tube to become focussed. During the flyback of the time base the dot, dash and strobe pulses are inhibited at their sources.

Figure 6:
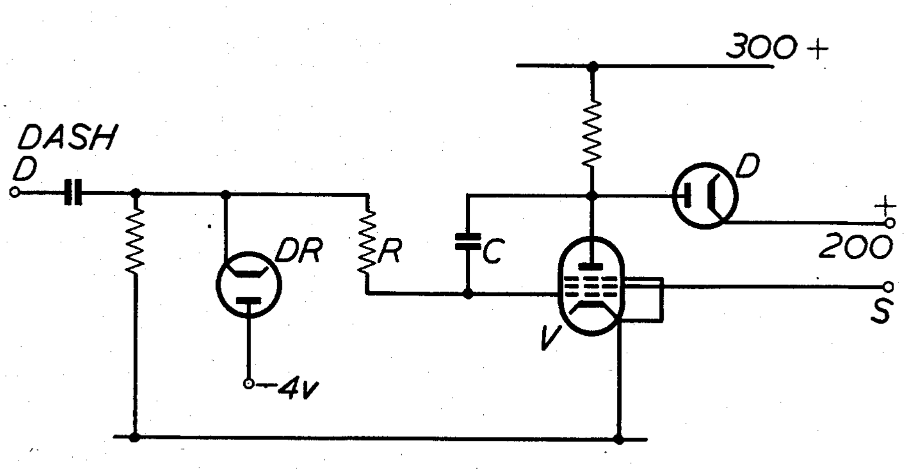
Figure 6 shows the X time-base generator of the apparatus of Figure 2.

The X time-base voltage applied to the X plates 17 of the cathode ray tube is caused to pause between its linear run down periods corresponding to the irradiation of each discrete area on which information is to be stored. A portion of the X time-base voltage is indicated in Figure 3(*e*) and has a constant voltage portion from $t_0$–$t_4$, $t_0^1$–$t_4^1$ and a run down or progressively changing portion from $t_4$–$t_0^1$ etc. The circuit for producing this type of time-base voltage is shown in Figure 6.

At times $t_0$, $t_0^1$ etc., when the potentials on the X deflecting plates 17 are such that if the electron beam were switched on a discrete area would be irradiated, the beam is switched on either by a dot pulse (Figure 3(*a*)) or a dash pulse (Figure 3(*b*)). If the binary digit "0" is to be stored the beam is switched on by a dot pulse and if the binary digit "1" is to be stored the beam is switched on by a dash pulse. If no information is to be stored on a line each discrete area in the line is irradiated by applying a dot pulse to the cathode ray tube control grid. Thus a "0" indication consists of a defocussed spot existing from time $t_0$–$t_3$ and a "1" indication consists of a spot existing from $t_0$–$t_4$ the spot being defocussed from $t_0$–$t_3$ and focussed from $t_3$–$t_4$.

When the discrete area is again irradiated by the cathode ray tube electron beam a transient signal shown in Figure 3(*f*) will be generated in the pick-up electrode 20 if a "0" was previously stored and a transient signal shown in Fig. 3(*g*) will be generated in the pick-up electrode if a "1" was previously stored. It will be seen that in the case of a "0" the first part of the transient signal is a negative pulse and in the case of a "1" the first part of the transient signal is a positive pulse. The parts of these signals falling within the strobe pulses are used to regenerate the stored information in a manner now to be explained with reference to Figure 2 and an explanatory waveform diagram Figure 4.

Figure 4:
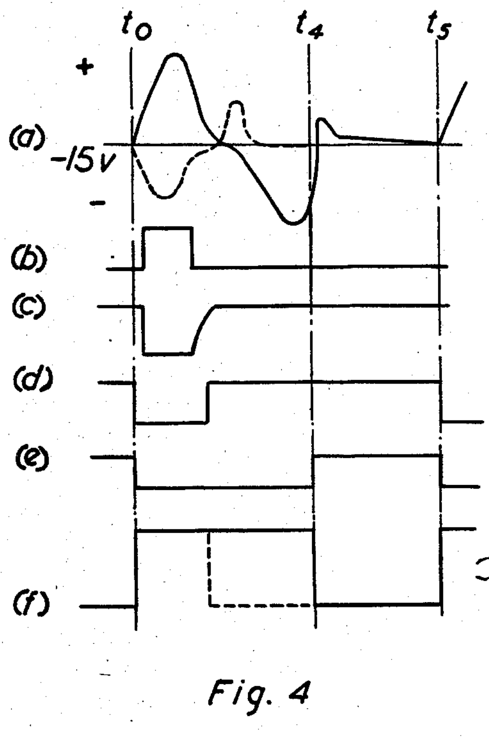
Figure 4 shows waveforms illustrating the operation of the gate circuit shown in Figure 2.

The standard charge distributions corresponding to "0's" are provided by negative-going dot pulses, one of which is shown in Figure 4(*d*), which are applied to the cathode of a diode D6 from the dot pulse generator 23 from a resting level of +5 volts. These pulses are applied in turn to the control grid of a valve V3 and cause the anode current of this valve to be cut off. The potential at the anode of valve V3 thus rises until caught by the diode D7 at +50 volts. The resulting pulses at the anode of valve V3, one of which is shown dotted in Figure 4(*f*) are fed to the control grid of a cathode follower valve V4, and the resultant positive-going dot pulses across the cathode load resistance of this valve are applied through a D.C. restoring circuit 28 to the control grid 13 of the cathode ray tube. Signals from the pick-up electrode 20 are applied through an amplifier 29 to the control grid of a valve V1. The output signal from the amplifier when a charge distribution due to a "0" (a defocussed spot) is irradiated is shown in dotted line in Fig. 4(*a*) and that when a charge distribution due to a stored "1" (a defocussed-focussed spot) is irradiated is shown in full line in Figure 4(*a*). The anode current of valve V1 is normally cut off since its control grid is connected through a normally conducting diode D1 to a source of −10 volts. However, the diode D1 has positive-going strobe pulses, one of which is shown in Figure 4(*b*), applied to its cathode from the strobe pulse generator 26 and these render the diode D1 non-conducting during their occurrence. Thus when a positive pulse from the amplifier 29, due to a stored "1," is applied to the control grid of valve V1 the potential at the anode of the valve, which is normally held at +50 volts by the diode D2, falls during the simultaneous occurrence of a strobe pulse and a positive pulse from the amplifier. The resultant negative pulse at the anode of valve V1 has a waveform shown in Figure 4(*c*). Negative pulses, due to a stored "0," applied to the control grid of valve V1 from the amplifier 29 produce no effect at the anode of the valve.

The negative pulse at the anode of valve V1, due to a stored "1," is fed to the control grid of a cathode follower valve V2. Negative-going dash pulses, one of which is shown in Figure 4(*e*), are also applied to the control grid of valve V2 via a diode D5 the anode of which is biased to +5 volts. The upper limit of the potential on the control grid of valve V2 is defined at zero volts by conduction of the diodes D3 and D4 and its lower limit is defined at −15 volts by conduction of the diode D5. The potential on the cathode of valve V2 will therefore swing between approximately +3 and −12 volts which are sufficient to cause respectively full anode current and zero anode current in the valve V3. The condenser C1 in the control grid circuit of valve V2 prevents the grid voltage of this valve changing unless it is driven. Thus the potential on the control grid of valve V2 will be driven to −15 volts initially by the leading edge of the negative pulse applied to it from the anode of valve V1 and will remain there until driven back to zero volts by the positive-going trailing edge of a dash pulse. The potential on the control grid of valve V2 will then remain at zero volts until another negative pulse is applied thereto from the anode of valve V1. The negative-going leading edge of a dash pulse applied to the diode D5 will not affect the potential on the control grid of valve V2 since the potential change due to this leading edge cannot get through the diode D5. Thus a negative pulse having its leading edge coincident with the leading edge of a strobe pulse (Figure 4(*b*)) and its trailing edge coincident with the trailing edge of a dash pulse (Figure 4(*f*)) will be produced at the cathode of valve V2 in response to the detection of a "1." This pulse is applied to the control grid of valve V3 which also has negative-going dot pulses (Figure 4(*d*)) applied to it. The anode current of valve V3 will then be cut off initially by the leading edge of a dot pulse and will be cut on again by the trailing edge of the pulse from the cathode of valve V2. The resultant positive pulse at the anode of valve V3, which is a positive going dash pulse, is applied to the cathode ray tube control grid via the valve V4 and the D.C. restoring circuit 28.

To summarise, if the stored information on a discrete area was originally a "0" a dot pulse will be applied to the cathode ray tube control grid when this area is reached again in the scan cycle produced by the time-base circuits 22. A defocussed spot (a "0") will thus be rewritten on this area, however, if the stored information was previously a "1," a dash pulse will be applied to the cathode ray tube control grid when this area is reached again in the scan cycle. A defocussed-focussed spot will then be rewritten on the area. Thus the stored information is regenerated.

It will be seen from Fig. 3(*e*) that the beam is periodically halted at $t_0$, $t_0^1$, etc., and pauses in its movements until $t_4$, $t_4^1$, etc. The beam is switched on, that is, it has its intensity increased, by dot or dash pulses of Fig. 3(*a*) or (*b*) at the moment when the movement of the beam is halted. In the case of the dot pulses of Fig. 3(*a*) these serve to decrease the beam intensity substantially to zero or switch the beam off at $t_3$, $t_3^1$, etc., that is to say before the end of the halted intervals $t_0$ to $t_3$, $t_0^1$ to $t_3^1$, etc. During each dot pulse the beam impinges upon or bombards an area bearing a stored charge and a voltage representative of this charge is generated in the signal plate 20 (Fig. 2), this voltage having the form shown in full or dotted lines in Fig. 4(*a*) according to the state of the charge. The initial transient of this waveform of Fig. 4(*a*) is extracted by means of a strobe pulse of Fig. 4(*b*) after which, in the case where the charge represented a "0," the beam is extinguished, that is to say its intensity is reduced substantially to zero, at the end of the dot pulse of Fig. 4(*d*) until the end of the halted interval. Where the initial transient extracted represents a 1, this voltage is applied through the circuit 24 of Fig. 2 to the control grid 13 of the tube 11 to modulate the beam intensity and thereby maintain the beam intensified or switched on for the duration of a dash, that is until $t_4$ in Fig. 3.

The gate circuit 24 in addition to providing regeneration enables the stored information to be easily read off. A convenient "read" output is derived via terminal 30 from the cathode of valve V2 and takes the form of a negative pulse for each stored "1." New information may also readily be written into the store over existing information. In order to write a "1" into a particular discrete area a negative pulse timed with the period when the cathode ray tube beam is switched on by a dot pulse is applied to the cathode of a diode D8 via a terminal 31. This will extend the dot pulse into a dash pulse and so write the appropriate defocus-focus spot (a "1"). In order to write a "0" over an existing "1" a negative pulse is fed via terminal 32 to the suppressor grid of valve V1 to prevent anode current flowing in that valve during the writing periods, such a pulse could be of dash pulse length. This terminal 32 may be considered as an "erase" terminal, since by applying suitable pulses to it any stored information may be obliterated and replaced by the standard pattern of "0's." An alternative "write" input, when it is desired to convert a "0" into a "1" would consist in the application, via a diode, of a dash pulse to the control grid of valve V3.

In Figure 2 the dot pulse generator 23, valves V3 and V4, the D.C. restoring circuit 28 and the modulating electrode 13 constitute a writing unit. Dot pulses from 23 are applied continuously to the modulating electrode whichever digit is to be stored. The valves V1 and V2 and the dash pulse generator 25 constitute a reading unit. The pick-up electrode 20 applies voltages generated therein corresponding to changes in the charge on areas bombarded by the cathode ray beam through amplifier 29 to the reading unit. When these voltages are positive-going and occur during a strobe pulse from the generator 26, the reading unit is conditioned to generate at the anode of D6 dash pulses from 25 which are applied to the writing unit. As is seen from Figure 4, the dash pulses (Figure 4(*e*)) have a longer duration than the dot pulses (Figure 4(*d*)) and have an initial portion of the same shape as the dot pulses and occurring before the end of the dot pulses.

Figure 8:
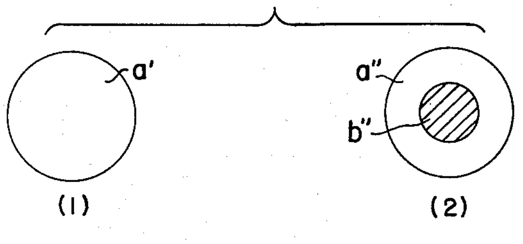
Figures 8 and 9 show discrete areas bombarded according to two forms of the invention when storing a "0" and a "1" on these areas respectively.

Figure 8 shows diagrammatically the conditions when a "0" and a "1" are stored on consecutive discrete areas. The "0" is represented by bombardment of the area $a'$ at (1) with the defocused beam only, a positive charge being produced over this area. The "1" is represented as shown at (2) by first bombarding the area $a''$ with the defocused beam and then bombarding the central part $b''$ of the area $a''$ with a focused beam. The positive charge on the part of $a''$ outside $b''$ is then partly or completely neutralised by secondary electrons ejected from $b''$.

The particular circuits described above operate so that a "0" is represented by a "defocus only" beam and a "1" by a "defocus-focus" beam. This selection is quite arbitrary and may be replaced by the reverse arrangement. It is then necessary to rearrange the gate circuit of Figure 2 so that dash pulses are normally fed to the cathode ray tube grid to write a defocus-focus pattern for "0's" and to convert the dash pulse into a dot pulse to cause a "1" to be written if a negative pulse is obtained from the amplifier during the stroke pulse following the turn on of a defocussed beam.

Figure 5:
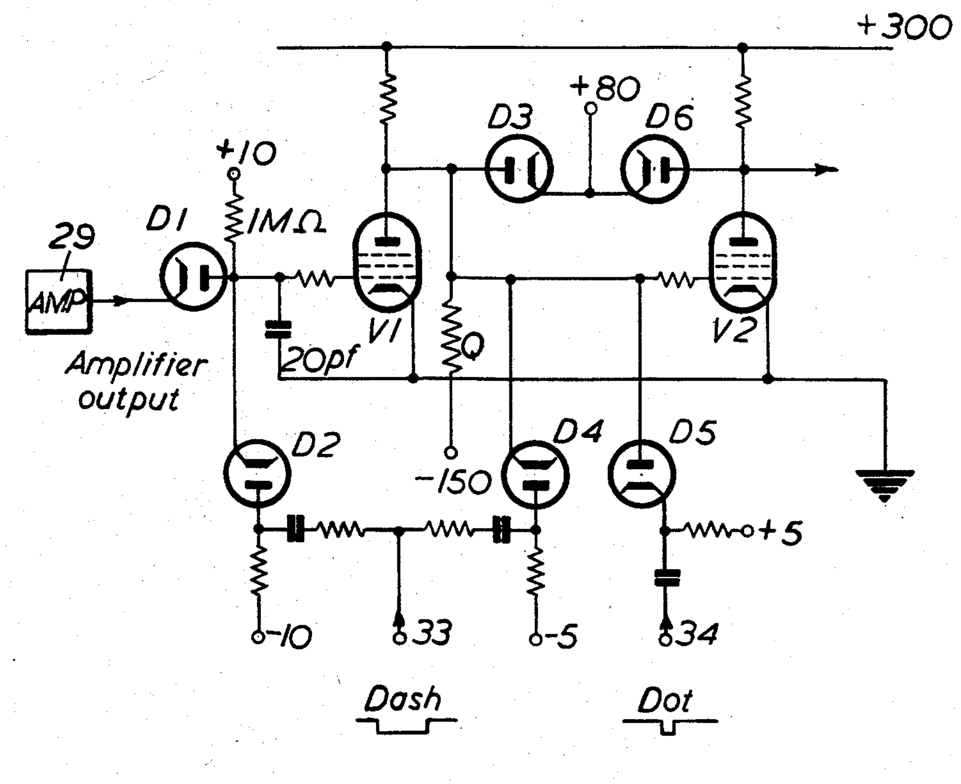
Figure 5 shows an alternative gate circuit for use in storage apparatus according to this invention when the digit "0" is stored as a defocussed-focussed spot and the digit "1" is stored as a defocussed spot.

The modified circuit of the gate circuit 24 is shown in Figure 5. The output from the amplifier 29 is applied via a diode D1 to the control grid of valve V1. With zero or positive pulse input from the amplifier the control grid of valve V1 is at earth potential and its anode is at a low positive voltage this valve being conducting. A resistance chain including resistance Q connects the anode of valve V1 to a source of −150 volts, and the control grid of valve V2 which is connected to the anode of valve V1 has a potential on it sufficient to prevent anode current flow in the valve V2. The potential on the anode of valve V2 is prevented from exceeding +80 volts by the diode D6. Negative-going dash pulses are fed via a terminal 33 and diode D4 to the control grid of valve V2, the anode of the diode D4 being connected through a resistor to a point at −5 volts. The positive-going portions of the dash waveform applied at terminal 33 are arranged to render the valve V2 conducting. In the absence of the application of a negative pulse (due to a stored "1") to the control grid of valve V1, the negative-going portions of the dash waveform will produce positive dash pulses at the anode of valve V2. These dash pulses are fed via a cathode follower valve (not shown) to the grid of the cathode ray tube each to produce defocus-focus spots (0's).

When the amplifier 29 delivers a negative pulse due to a stored "1," the anode current of valve V1 is cut off and remains cut off, owing to the long time constant of the resistance and capacity in its grid circuit, until the control grid is driven to earth potential again by the positive-going trailing edge of a dash pulse which is applied to the control grid of valve V1 via terminal 33 and diode D2. The anode of valve V1 has a potential of +80 volts, as defined by the diode D3, during a dash pulse. The resistance chain connected to the anode of valve V1 is such as to give the control grid of valve V2 a tendency to be at earth potential under these conditions. However negative going dot pulses are applied via terminal 34 and a diode D5 to the control grid of valve V2 and these cut off the anode current of the valve, during their occurrence. The cathode of the diode D5 is connected through a resistor to a point at +5 volts. A positive dot pulse is therefore produced at the anode of valve V2 and the cathode ray tube beam will be switched on for the dot period only, to produce the plain defocussed beam (a "1").

Figure 1:
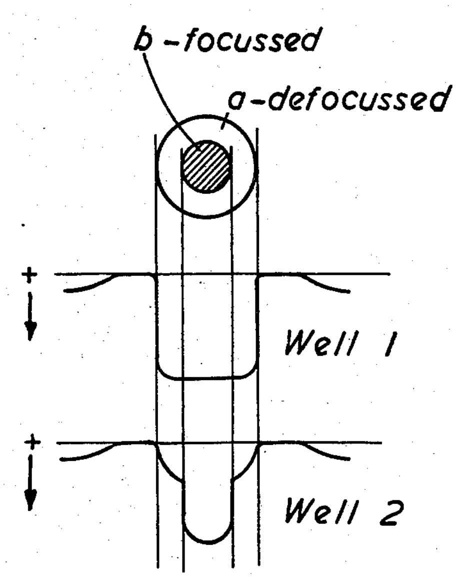
Figure 1 is a diagram illustrating the invention.
Figure 7:
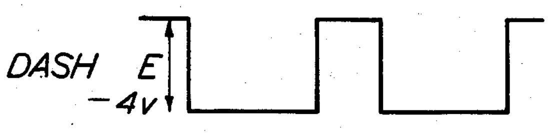
Figure 7 shows the waveforms illustrating the operation of the circuit shown in Figure 6.

Figure 6 shows the time-base circuit for producing a time-base voltage having a waveform shown in Figure 3(*e*) and Figure 7 is an explanatory waveform diagram. The circuit comprises a valve V having a condenser C connected between its anode and control grid whereby it acts as a Miller time-base. The time-base circuit 22 of Figure 1 include dividing circuits which produce a time-base synchronising voltage which is positive for 32 pulse periods (i.e. during the scan of a line) and is negative for 4 pulse periods (i.e. during the time-base flyback period). This synchronising voltage is applied via terminal S to the screen grid of valve V and when this voltage goes positive, anode current in the valve V, which is cut off during flyback periods, will begin to flow. The potential on the anode which is held at 200 volts by the diode D will then begin to fall at a rate determined by the value of a resistance R in the grid circuit, the value of the condenser C, and the voltage to which the control grid is taken.

Negative going dash pulses, shown in Figure 7, are applied to the control grid of valve V via terminal D and are D.C. restored by the diode DR to a potential equal to the mean grid potential during the sweep. During the occurrence of an applied dash pulse no current flows in the resistance R and the rate of fall of voltage to the anode of valve V is therefore zero. If E is the voltage amplitude of the dash pulses then the rate of fall of anode voltage in the period between dash pulses is E/RC.

The time-base synchronising voltage may be used to inhibit the dot, dash and strobe pulses at their sources during the time-base flyback period.

The embodiment of the invention described above could conveniently be used in a digital computor operating in the serial mode but the invention can, of course, be used in a computor operating in the parallel mode, in which case the paused time base shown in Fig. 6 would be replaced by the stepped time base normally used in parallel mode computors.

In the description above the variation of the size of the bombarded area on the screen has been described as the result of a variation in the degree of focus produced by varying the potential on the second anode 15.

Other methods of varying the size of the bombarded area will be obvious to those skilled in electronics. For example it is well known that with a fixed focussing field it is possible to vary the effective size of the bombarded spot by varying the electron beam intensity. This may be effected by varying the potential of the control grid 13 and in many cases this is the preferable mode of operation. The necessary modifications of the circuit is obvious, thus the defocus-focus voltage generator 27 is connected to the grid 13 instead of to the anode 15 and is arranged to produce voltage variations suitable for grid control.

In all modes of operation when the "well" of charge has been modified, it has been stated that on a subsequent bombardment a positive pulse will be obtained, because the effective positive charge produced in the neighbourhood of the pick up electrode 20 is greater than the negative charge due to the electron cloud effect. However care must be taken to ensure that the intensity of the incident electron beam is suitable to give the desired effect.

When the grid modulation method is used the broad (defocussed) spot will be bombarded by an intense beam and the smaller (focussed) spot by a less intense beam. In this case subsequent bombardment initially by the intense beam may produce a negative pulse which is not sufficiently overshadowed by the positive pulse due to recharging a "modified" spot.

If this deleterious effect cannot be overcome by suitable choice of operating voltages further steps may be taken. Thus, when grid modulation is used, the electron beam may be "chopped" by high frequency pulses applied to the control grid 13 during the initial bombardment. The result of this is that in the initial (broad intense spot) bombardment of the area, the electron cloud effect will produce a series of high frequency negative and positive pulses due to the beam coming on and off and these will cancel each other and not interfere with the positive pulse produced by reproducing a "well" when the charge at the area has been modified. The input to the amplifier 29 contains a resistance capacity combination of such time constant that it effectively integrates the high frequency negative and positive pulses. For example, the beam may be chopped at, say, 20 megacycles/second and if the amplifier 29 has no appreciable response at this frequency, the amplifier output signals obtained by bombardment by the chopped beam will substantially correspond with that obtained from an unchopped beam of the same mean intensity and the negative pulse due to the electron cloud effect will be correspondingly smaller while the spot size will have the larger value corresponding to the peak intensity of the chopped beam.

Figure 9:
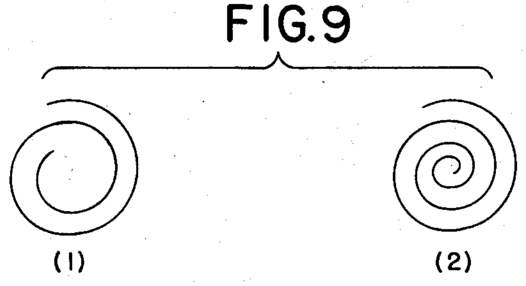

In yet another mode of operation the outer area may be bombarded by keeping the electron beam small but moving it rapidly over the area. The inner area may then be bombarded by restricting or preventing this movement of the beam. In one embodiment for carrying out this mode of operation the beam is made to scan a decreasing spiral path by applying damped high frequency sinusoidal voltages in quadrature to the X and Y deflecting plates 17 and 18. The damped voltages may be obtained from a ringing circuit which is excited at the beginning of the initial bombardment. The electron beam is switched on to effect the initial bombardment while the spot is moving in the outer turns of the spiral. The electron beam is then switched off and if the stored charge is to be modified is switched on when the spot has reached the inner turns of the spiral. Alternatively, if the stored charge is to be modified the beam may be left on until the scanning spot has reached the centre of the spiral and it will then reduce the positive charge on the outer circle. Thus as shown in Figure 9, in order to store a "0" the beam may be moved over the outer turns of a spiral shown at (1), whereas in order to store a "1" the movement of the beam is continued until the center of the spiral is reached as shown at (2), the bombardment of the central part releasing secondary electrons which wholly or partly neutralise the positive charge on the outer part. In both cases subsequent bombardment will yield a positive or negative initial pulse according to whether the stored charge has been modified or not.

Figure 10:
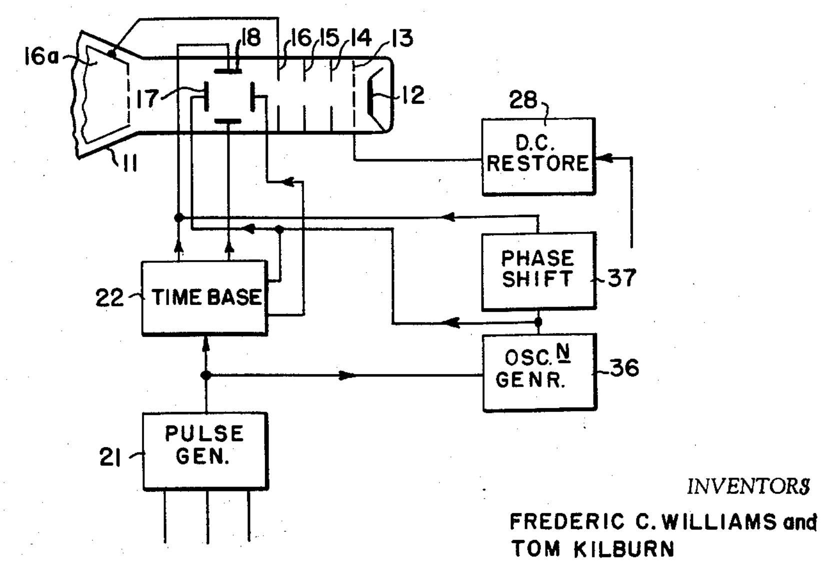
Figure 10 shows a modification of part of the apparatus of Figure 2 for operating in accordance with Figure 9.

The way the circuit of Figure 2 may be modified in order to carry out the spiral scan of Figure 9 is indicated in Figure 10. The defocus-focus device 27 is omitted and there is applied to the deflecting plate 17 a damped sinusoidal oscillation from a generator 36. A phase-shift device 37 shifts the phase of the oscillations from 36 through 90° and these quadrature oscillations are applied to the deflecting plate 18.

Figure 11:
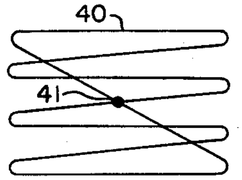
Figure 11 illustrates the pattern of rectangular scanning.

In another embodiment the spot is arranged to scan not a spiral but a rectangle or square for instance along the scanning path shown at 40 in Fig. 11, by the application of suitable high frequency voltages to the X and Y deflecting plates 17 and 18. This rectangle or square then constitutes the outer area and the inner area is bombarded by restricting or stopping the movement of the beam, thereby for instance bombarding a spot 41. In this embodiment small but rapid voltage variations from auxiliary scanning generators are applied to the X and Y plates to scan the outer area and the defocus-focus voltage generator 27 is used to inhibit the scanning process while the beam is still on if the charge has to be modified.

In all cases where the outer area is scanned during the first bombardment the movement must be so rapid that while one part of the outer area is being bombarded the positive charge on other parts of the area will not be substantially reduced. Of course, when the inner area is bombarded the positive charge on the remaining part of the outer area is largely or entirely dissipated.

We claim:

1. In a cathode ray storage tube, a storage surface, and means setting up one of two different states of charge distribution on first and second discrete areas of said storage surface comprising a source of electrons, accelerating means causing the bombardment of said areas by electrons from said source, and control means controlling said electron bombardment, said control means including an input, first signal means coupled to said input and producing a first predetermined signal therein, said control means including means responsive to said first signal and causing said electrons to bombard said first discrete area, and second signal means coupled to said input and producing a second predetermined signal therein, said control means including means responsive to said second signal and causing said electrons to first bombard said second discrete area and then to bombard only a portion of said second discrete area.

2. In a cathode ray storage tube, a storage surface, and means setting up one of two different states of charge distribution on discrete areas of said storage surface comprising a source of electrons, accelerating means causing the bombardment of said areas by an electron beam from said source, and control means for controlling the activity of said electron beam, a signal source selectively producing one of two predetermined signals coupled to said control means, said control means including means responsive to each of said predetermined signals and causing said electron beam to bombard a first discrete area in response to one of said signals, and causing said electron beam to bombard a second discrete area and then a portion of said second discrete area in response to the other of said signals.

3. The apparatus claimed in claim 2 in which said control means includes a focusing electrode, said signal source including means producing a first predetermined signal of a first state and a second predetermined signal of said first state followed by a second state and means selectively applying said signals to said focusing electrode.

4. The apparatus claimed in claim 3 in which said control means includes field producing means controlling the bombardment of said discrete areas so that said second discrete area becomes more highly charged in a portion thereof than in the remainder thereof.

5. The apparatus claimed in claim 2 in which said control means includes a focusing electrode and an intensity electrode, a source of fixed potential coupled to said focusing electrode, said signal source being coupled to said intensity electrode and including means selectively producing a first potential and a first potential followed by a second and different potential.

6. The apparatus claimed in claim 2 in which said control means includes means rapidly moving said electron beam over said first predetermined area in response to the first of said signals and restricting the movement of said beam in response to the second of said signals.

7. The apparatus claimed in claim 6 in which said signal source includes a circuit generating two damped sinusoidal voltages in quadrature, said control means including an electrode coupled to said circuit responsive to said damped sinusoidal voltages, said electrode being so located that it produces a varying control field adjacent said electron beam to cause a spiral movement of said electron beam over said discrete area.

8. A method of storing information, represented by one of two differing electrical states, upon a storage surface which comprises bombarding a first discrete area of said surface with an electron beam to produce a first charge distribution upon said area to correspond to information of one of said states, and bombarding a second discrete area and then bombarding only a portion of said second area with said electron beam to produce upon said second area a charge distribution different from said first charge distribution and representative of information of the other of said states.

9. A method of storing information upon a surface and later reading said information comprising bombarding a discrete area of said surface with a defocused electron beam, focusing said beam to bombard only a portion of said discrete area, stopping the bombardment of said electron beam upon all portions of said discrete area, and redirecting said beam in defocused condition to bombard said entire discrete area.

10. A method of storing information upon a plurality of discrete areas of a storage surface comprising bombarding each such discrete area in succession with an electron beam while rapidly moving said electron beam over said discrete area in order to store one item of information on such areas, and in order to store another item of information on a selected one of said discrete areas, subsequently restricting the movement of said beam to only a portion of said selected discrete area.

11. The method claimed in claim 8 in which said first charge distribution represents a charge uniformly distributed over said first area, and said second charge distribution represents a higher charge on a portion of said second area than on the remainder of said second area.

12. In a cathode ray storage tube, a storage surface and means for setting up one of two different states of electric charge on a discrete area of said storage surface under the control of signals to be stored, said means comprising a source of electrons, means to accelerate a beam of electrons from said source towards said storage surface, beam control means for controlling said beam in two sequences of bombardment of said storage surface, namely (*a*) a bombardment of said discrete area and (*b*) a bombardment of said discrete area followed by a bombardment of a region within the outer boundary of said discrete area, and means to apply said signals to said beam control means to select from said sequences (*a*) and (*b*).

13. A method of storing information of two electrical values upon two discrete areas of a storage surface respectively, which comprises bombarding the first of said discrete areas with an electron beam to produce a first state of electric charge upon said first area to represent one of said electrical values and bombarding with an electron beam first the second of said discrete areas and subsequently a third area within the outer boundary of said second discrete area to produce a second state of electric charge upon said second discrete area to represent the other of said electrical values.

14. A method according to claim 13 wherein said third area forms part of said second discrete area.

15. A method according to claim 13 wherein said third area is distinct from said second discrete area.

16. The method claimed in claim 13 in which said bombardment of said second discrete area is effected by sweeping said beam in a decreasing spiral path, switching said beam on to sweep the outer turns of said spiral and switching said beam off, and bombardment of said third area is effected by switching said beam on again to sweep the inner turns of said spiral.

17. A method of storing information upon a storage surface according to claim 13 wherein said first discrete area is rectangular and is bombarded by scanning at least a part of the discrete area with said electron beam and then restricting the movement of said beam to a portion of said discrete rectangular area.

18. A method of storing information upon a storage surface comprising the bombardment of a discrete area of said surface by an electron beam when a first state of information is to be recorded, and the bombardment of said discrete area followed by a more intensive bombardment of a portion of said storage surface within the outer boundaries of said discrete area when a second state of information is to be recorded.

19. In a device for electrostatically storing digital information, in combination, an insulating surface for storing information thereon as a plurality of discrete charges, a source of electrons, means accelerating electrons from said source toward said surface, and control means causing said electrons to bombard a first discrete area of said surface in response to a first information being stored, said control means causing said electrons to bombard a second discrete area of said surface followed by a more intensive bombardment of a portion of said storage surface within the outer boundaries of said second discrete area in response to a second information being stored.

20. The device of claim 19 in which said electron source includes a control grid, said control means comprising a gating circuit having a first distinctive output state when a first information is being recorded and having a second distinctive output state when a second information is being recorded, and means coupling the output of said gating circuit to said control grid.

21. A method of storing information upon a storage surface comprising a first bombardment of first portions of a discrete area of said surface by an electron beam in response to a first state of information to be recorded, and the subsequent bombardment of portions of said discrete area in response to a second state of information to be recorded, said subsequent bombardment including the bombardment of at least one portion of said discrete area bombarded during said first bombardment.

22. A cathode ray storage tube according to claim 12, wherein said beam control means comprise beam focus control means increasing the sharpness of focus of said beam during the bombardment of said region.

23. A cathode ray storage tube according to claim 12, wherein said beam control means comprise beam deflecting means scanning said beam over at least part of said discrete area during said bombardments of said discrete area.

24. Electrical information-storing apparatus comprising a cathode ray tube, an electric charge-retaining recording surface within the envelope of said tube, a pick-up electrode capacitively coupled to said surface, beam deflecting means to direct the electron beam of said tube toward selected areas of said recording surface, a writing unit and a reading unit, said writing unit including beam modulating means responsive to pulses of two different kinds to produce two different charge conditions on said areas respectively, first pulse generating means generating pulses of a first of said kinds and means connecting said first pulse generating means and said modulating means to apply pulses of said first kind continuously to said modulating means, said reading unit comprising second pulse generating means generating pulses of a second of said kinds, means connecting said pick-up electrode to said reading unit to condition the reading unit to generate pulses of said second kind in response to predetermined signals generated in said pick-up electrode, and means connecting said reading unit to said writing unit to apply to said writing unit pulses of said second kind, each of the pulses of said second kind having a longer duration than the pulses of said first kind and having an initial portion of substantially the same shape as the pulses of said first kind and occurring before the end of a pulse of the said first kind.

25. In a digital computer, an electrostatic storage device comprising a storage element, electron gun means including control means for directing an electron beam on said element to develop electrostatic charges on said element, means for deflecting said beam relatively to said element, means for generating and applying to said deflecting means a voltage having a waveform including progressively changing portions separated by portions of constant value whereby the beam is scanned over said element and caused to pause during recurrent intervals, means coupled to said control means for switching said beam on substantially at the beginning of each of said intervals and off before the end of each interval, a signal plate mounted adjacent said element and coupled to said control means to apply voltages developed in said signal plate to control the said beam in order to regenerate the said charges.

26. In a digital computer, an electrostatic storage device comprising a storage element, electron gun means including control means for directing an electron beam on said element to develop electrostatic charges on said element, means for deflecting said beam relatively to said element, means for generating and applying to said deflecting means a voltage having a waveform including progressively changing portions separated by portions of constant value whereby the beam is scanned over said element and caused to pause during recurrent intervals, a pulse generator to generate pulses of duration less than that of said intervals, means connected to said control means to apply said pulses to switch said beam on and off during said intervals, a signal plate mounted adjacent said element and coupled to said control means to apply voltages developed in said signal plate to control the said beam in order to regenerate the said charges.

27. The method of storing information as a plurality of electrostatic charges on a storage element which comprises the steps of scanning the said element with an electron beam, periodically halting said scanning for predetermined intervals of time, and reducing the intensity of said electron beam for a predetermined time during only a part of each of said intervals of time.

28. The method of storing information as a plurality of electrostatic charges on a storage element which comprises the steps of scanning said element with an electron beam, halting said scanning for a predetermined interval of time as said beam impinges upon a stored charge, extracting an initial transient voltage produced by the bombardment of said beam upon said stored charges, and extinguishing said electron beam for at least part of the remainder of said predetermined interval following said step of extraction.

29. The method of claim 27 in which the intensity of said electron beam is increased not earlier than the beginning of each of said halted intervals and is reduced prior to the end of said halted intervals.

30. In a digital computer, an electrostatic storage device comprising an electric charge-retaining screen, means including intensity control means for directing an electron beam on said screen to develop electrostatic charges on said screen, means adjacent said beam for deflecting said beam relatively to said screen, time-base generating means coupled to said deflecting means and applying to said deflecting means a voltage having a waveform including progresively changing portions separated by portions of constant value whereby the beam is scanned over said screen and caused to pause during recurrent intervals, a pulse generator for generating pulses each having a duration less than one of said intervals, means for locking said pulse generator to said time-base means to cause said pulses to occur at least partly during said intervals, and means to apply said pulses to said intensity control means to modulate the intensity of said beam.

31. In a digital computer, an electrostatic storage device comprising an electric charge-retaining screen, means including intensity control means for directing an electron beam on said screen to develop electrostatic charges on said screen, means for deflecting said beam relatively to said screen, time-base means for generating and applying to said deflecting means a voltage having a waveform including progressively changing portions separated by portions of constant value whereby the beam is scanned over said screen and caused to pause during recurrent intervals, and switch means locked to said time-base means and coupled to said intensity control means for increasing the intensity of said beam substantially at the beginning of each of said intervals and to decrease the intensity of the beam before the end of each interval.

32. In a digital computer, an electrostatic storage device comprising an electric charge-retaining screen, means including intensity control means for directing an electron beam on said screen to develop electrostatic charges on said screen, means for deflecting said beam relatively to said screen, time-base means for generating and applying to said deflecting means a voltage having a waveform including progressively changing portions separated by portions of constant value whereby the beam is scanned over said screen and caused to pause during recurrent intervals, a pulse generator synchronized with said time-base means and generating pulses of duration less than that of said intervals, and means to apply said pulses to said intensity control means to modulate the intensity of said beam during said intervals.

33. In a digital computer, an electrostatic storage device comprising a storage element, electron gun means comprising beam intensity control means for directing an electron beam on said element to develop electrostatic charges on said element, deflecting means adjacent said beam for deflecting said beam relatively to said element, means coupled to said deflecting means for generating and applying to said deflecting means a voltage having a waveform including progresively changing portions separated by portions of constant value whereby the beam is scanned over said element and caused to pause during recurrent intervals, means coupled to said beam intensity control means for recurrently switching said beam on for periods each including part of, and of duration less than, one of said intervals, a signal plate mounted adjacent said element, and means to apply voltages developed in said signal plate to control the said beam in order to regenerate the said charges.

References Cited in the file of this patent

UNITED STATES PATENTS

| | | |
|---|---|---|
| 2,093,157 | Nakashima | Sept. 14, 1937 |
| 2,245,364 | Riesz et al. | June 10, 1941 |
| 2,423,304 | Fitch | July 1, 1947 |
| 2,436,827 | Richardson et al. | Mar. 2, 1948 |
| 2,438,709 | Labin et al. | Mar. 30, 1948 |
| 2,454,410 | Snyder | Nov. 23, 1948 |
| 2,498,081 | Joel et al. | Feb. 21, 1950 |
| 2,661,899 | Chromy | Dec. 8, 1953 |

OTHER REFERENCES

Jensen et al.: "Barrier Grid Storage Tube and its Operation," RCA Review, March 1948, vol. IX, No. 1, page 112.